United States Patent
Wilkins

(10) Patent No.: US 9,745,143 B2
(45) Date of Patent: Aug. 29, 2017

(54) PITCH INDEPENDENT DIVERT DRIVE

(71) Applicant: Intelligrated Headquarters, LLC, Mason, OH (US)

(72) Inventor: John J. Wilkins, Erlanger, KY (US)

(*) Notice: Subject to any disclaimer, the term of this patent is extended or adjusted under 35 U.S.C. 154(b) by 0 days.

(21) Appl. No.: 15/357,747

(22) Filed: Nov. 21, 2016

(65) Prior Publication Data
US 2017/0121124 A1 May 4, 2017

Related U.S. Application Data

(63) Continuation-in-part of application No. 14/063,400, filed on Oct. 25, 2013, now Pat. No. 9,499,341.

(51) Int. Cl.
| | |
|---|---|
| *B65G 47/46* | (2006.01) |
| *B65G 47/53* | (2006.01) |
| *B65G 13/06* | (2006.01) |
| *B65G 13/07* | (2006.01) |
| *B65G 13/10* | (2006.01) |

(52) U.S. Cl.
CPC ........... *B65G 47/53* (2013.01); *B65G 13/065* (2013.01); *B65G 13/07* (2013.01); *B65G 13/10* (2013.01)

(58) Field of Classification Search
CPC ........ B65G 13/04; B65G 47/54; B65G 47/71; B65G 17/24; B65G 13/06; B65G 13/071; B65G 13/073; B65G 13/065; B65G 13/12
USPC ............ 198/370.09, 371.3, 782; 193/35 MD
See application file for complete search history.

(56) References Cited

U.S. PATENT DOCUMENTS

| | | | | |
|---|---|---|---|---|
| 5,921,374 | A * | 7/1999 | Takino | B65G 13/10 193/35 MD |
| 7,040,478 | B2 * | 5/2006 | Ehlert | B65G 13/10 198/370.09 |
| 7,461,739 | B2 * | 12/2008 | Fourney | B65G 17/24 198/370.09 |
| 7,506,751 | B2 * | 3/2009 | Fourney | B65G 47/34 198/370.09 |
| 7,588,137 | B2 * | 9/2009 | Fourney | B65G 17/24 198/779 |
| 8,474,596 | B2 * | 7/2013 | Wolkerstorfer | B65G 13/10 198/370.09 |
| 8,567,587 | B2 * | 10/2013 | Faist | B65G 1/0478 198/370.09 |
| 2011/0022221 | A1 * | 1/2011 | Fourney | B65G 47/682 198/370.09 |

* cited by examiner

*Primary Examiner* — James R Bidwell

(57) ABSTRACT

A diverting conveyor has an array of transmissions having powered output rollers that form a conveying surface for selectively diverting articles from a first direction to a second direction. Each transmission has a timing belt pulley to operably engage with a toothed timing belt, and each is configured to simultaneously rotate the output roller from the first direction to the second direction in response to actuation of an actuator. When the timing belt pulley engages with the teeth of the timing belt, the output roller of an actuator is rotated around an axis perpendicular to the conveying surface to a rotational position that is a multiple of the tooth spacing of the timing belt. Each output roller has a driven direction resulting from the engagement of the timing belt with the timing belt pulley. An adjuster is provided to align the driven directions of the array of output rollers.

17 Claims, 9 Drawing Sheets

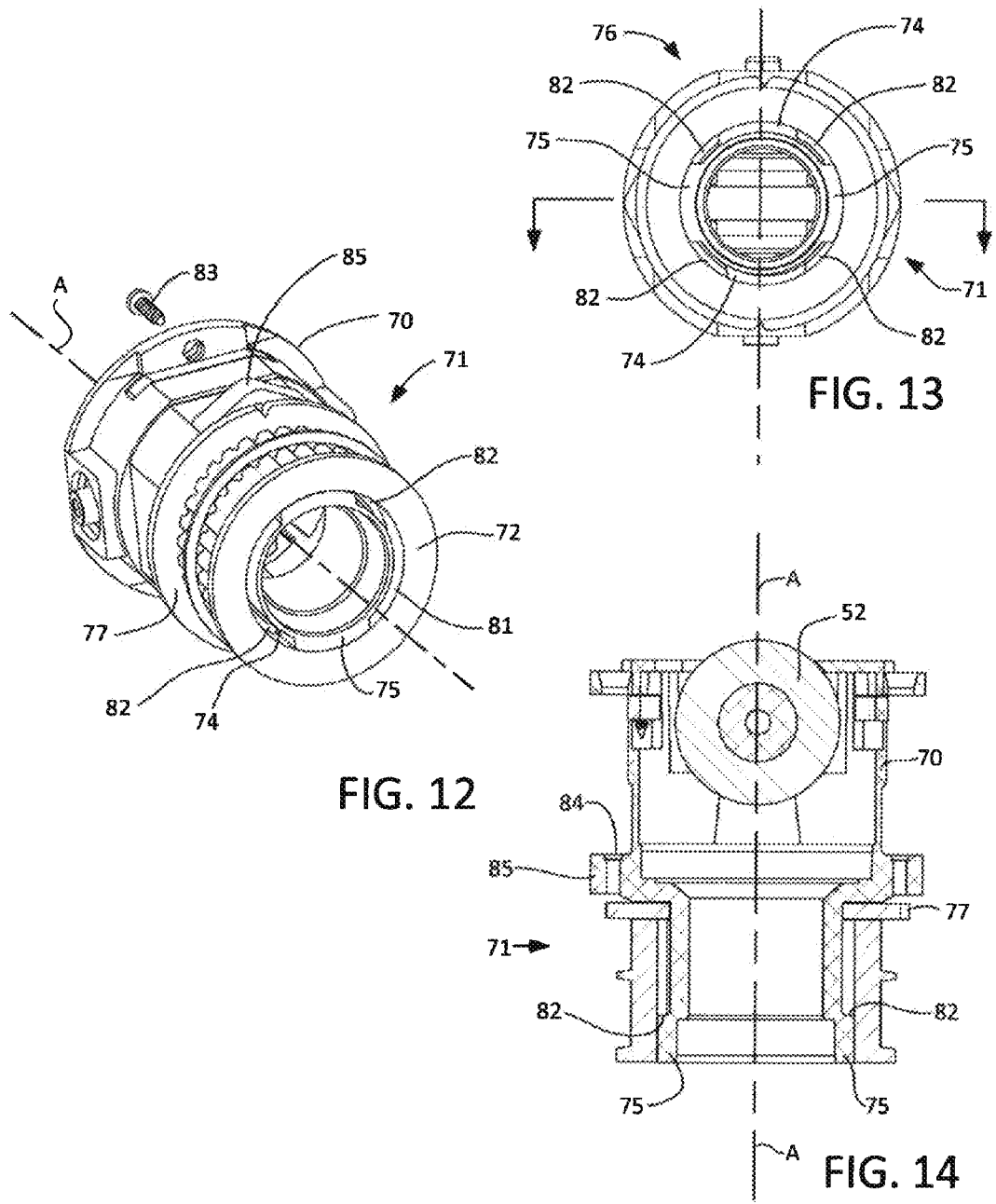

PITCH INDEPENDENT DIVERT DRIVE

RELATED APPLICATIONS

This application is a continuation-in-part to previously filed U.S. non-provisional patent application Ser. No. 14/063,400, entitled "Transmission Having Variable Output Orientation", which was filed on Oct. 25, 2013 by John Joseph Wilkins, which is hereby incorporated by reference in its entirety.

This application also claims priority to U.S. provisional patent application Ser. No. 61/718,864, which was filed on Oct. 25, 2012, the entirety of which is incorporated herein by reference for all purposes.

TECHNICAL FIELD

The present disclosure relates generally to transmissions, and is particularly directed to a transmission in which the output orientation can be varied. The innovation will be specifically disclosed in connection with material handling systems utilizing such variable output orientation transmissions for conveying articles.

BACKGROUND

The present disclosure relates generally to transmissions, and is particularly directed to a transmission in which the output orientation can be varied. The innovation will be specifically disclosed in connection with material handling systems utilizing such variable output orientation transmissions for conveying articles.

Typically, the output of a mechanical transmission has a fixed orientation relative to the orientation of the input. Occasionally, though, in many situations there is a need to vary the output orientation relative to the input orientation. One such situation arises with material handling systems.

With material handling systems, it is known to utilize a conveyor to transport a succession of articles along a desired path, to merge or combine a plurality of conveying paths to fewer paths, or to selectively direct articles to respective desired or selected locations or desired paths. For example, sortation conveyors in which articles may be selectively conveyed from the sortation conveyor onto another conveyor or to a desired intermediate or ultimate location by pushers, arms, pop up wheels, cross belts, tilt trays or other suitable structures. Configurations in which articles are selectively directed to one of a plurality of paths from a single conveyor include pick and pass, carton sequencing, work cell and single sort to multiple location configurations. Other examples include aligning conveyors, switching conveyors and merging conveyors. Conveyors are also used to engage sides of articles being transported.

Many different configurations are known for the conveying surface of a single conveyor, such as an endless conveying belt, moving slats or tubes, cross belts, tilt trays, and rollers to name a few. An example of rollers includes elongated cylindrical rollers which may be self driven, such as a motorized drive roller, or driven by an underlying endless belt urged into contact with the rollers. Another example of rollers includes individual spaced apart wheels having a small width relative to their diameters which may also be driven by an underlying endless belt urged into contact with the wheels. The circumference of such rollers may be flat, i.e., cylindrical, or arcuate which may have a constant radius, i.e., spherical, or may not.

It is known to configure the conveyor system to be capable of selectively directing articles from the conveying surface so as to following one of a plurality of paths therefrom. Examples of such configurations include a pusher and swinging arm to engage the article and push it sideways. For moving slats or tubes, a traveling pusher configuration may be used. Cross belt and tilt tray conveyors have individual sections that move as the conveyor and which are selectively actuated to cause the article thereon to move laterally until being discharged therefrom. Conveyors of wheels or elongated rollers may have laterally disposed conveying structures interposed therebetween at divert locations to cause the article to travel laterally to the desired path. In most such configurations, articles may be discharged from the main conveyor in one of two lateral directions the directing and thereof.

Although one or more embodiments will be described herein in connection with variable output orientation transmissions used in material handling systems, it will be understood that the present invention is not limited in use or application thereto. The teachings of the present invention may be used in any application in which variable output orientation transmissions may be beneficially used.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the subject innovation, a diverting conveyor is provided having a conveying surface for selectively diverting articles from a first direction to a second direction different from the first direction. The diverting conveyor includes an actuator attached to the diverting conveyor and a toothed timing belt attached to the actuator. An array of transmissions s provided, each having a first housing attached to the diverting conveyor and a second housing rotatable around the first housing about an axis perpendicular to the conveying surface. Each second housing has a timing belt pulley and an output roller attached to the second housing to rotate around the first axis therewith. Each output roller is rotatably attached to the second housing to rotate about a second axis parallel to the conveying surface and power driven to convey articles in a driven direction. A toothed timing belt is attached to the actuator having teeth in operable engagement with each timing belt pulley to interconnect each second housing to the timing belt and to the actuator for simultaneous rotation in response to actuation of the actuator. An adjustor adjustably secures the timing belt pulley to the second housing. Wherein when the array of transmissions are rotated with the actuator to position the output rollers to drive articles in the first direction, and one of the output rollers has a driven direction different from the first direction, the adjustor of the one of the output rollers having a driven direction different from the first direction is adjustable to redirect the output roller from the driven direction different from the first direction to the first direction.

Alternately, a diverting conveyor having a conveying surface comprising an array of transmissions interconnected together by a toothed timing belt to an actuator for selectively diverting articles from a first direction to a second direction different from the first direction in response to movement of the actuator can be provided. Each transmission includes an array of first housings attached to the diverting conveyor; and a second housing rotatable around each first housing to define a first axis of rotation perpendicular to the conveying surface. An output roller is rotatably attached to each second housing to define the conveying surface. Each output roller is connected to a source of power and rotatable around a second axis of rotation parallel to the conveying surface to directionally convey articles thereon. The plurality of rollers defines the conveying surface. An adjuster is attached to the second housing comprising a timing belt pulley and a lock. The timing belt pulley is rotatable about the first axis of rotation. The lock is configured to releasably lock the timing belt pulley to the second housing at a position to direct articles in a driven direction with the output roller. Wherein when the teeth of the toothed timing belt are brought into operable engagement with the array of locked timing belt pulleys, each second housing is configured to rotate independently around the respective first axis to align the timing belt pulley with the teeth of the timing belt and to rotationally directionally position the respective output roller to direct articles in a driven direction as an increment of the teeth spacing of the toothed timing belt, wherein when the toothed timing belt is brought into operable engagement with the array of locked timing belt pulleys, the actuator positions the array of output rollers to divert articles in the first direction, and at least one of the engaged output rollers in the operably engaged array has a driven direction different than the first direction from operable engagement with the teeth of the toothed timing belt, the adjuster of at least one of the engaged output rollers with a different driven direction is configured to be adjusted with the adjuster to reposition the output roller around the first axis to drive articles in the first direction.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE FIGURES

FIG. 12 shows an isometric bottom view of the upper housing of FIG. 11 with parts of the adjuster brought closer together from the positions shown in FIG. 11.

FIG. 13 shows a bottom view of the upper housing of FIG. 12 with the timing pulley interlocked to the upper housing.

FIG. 14 shows a side section view of the upper housing of FIG. 13.

DETAILED DESCRIPTION

Figure 1:
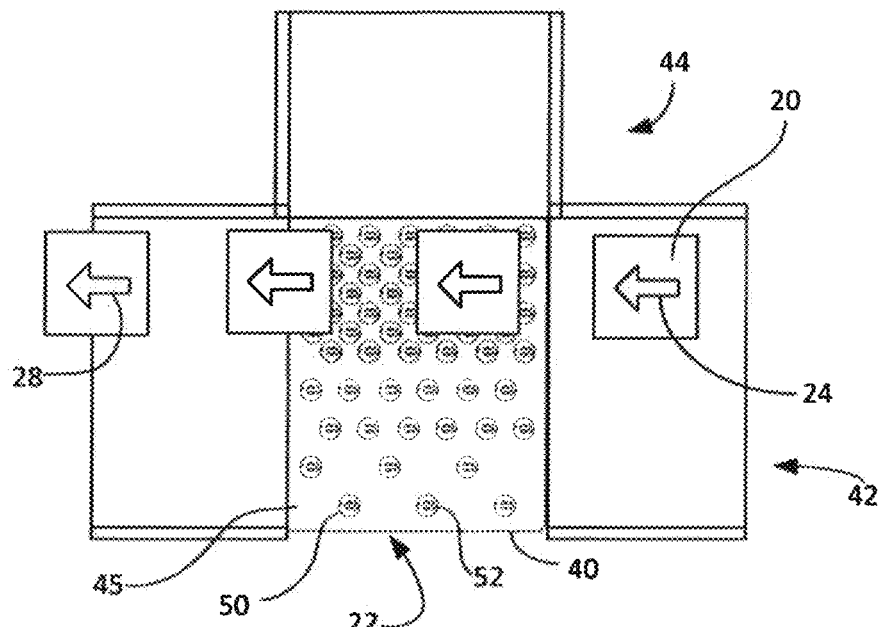
FIG. 1 shows a top view of a divert conveyor having an array of pitch independent transmissions conveying articles in a first direction.
Figure 2:
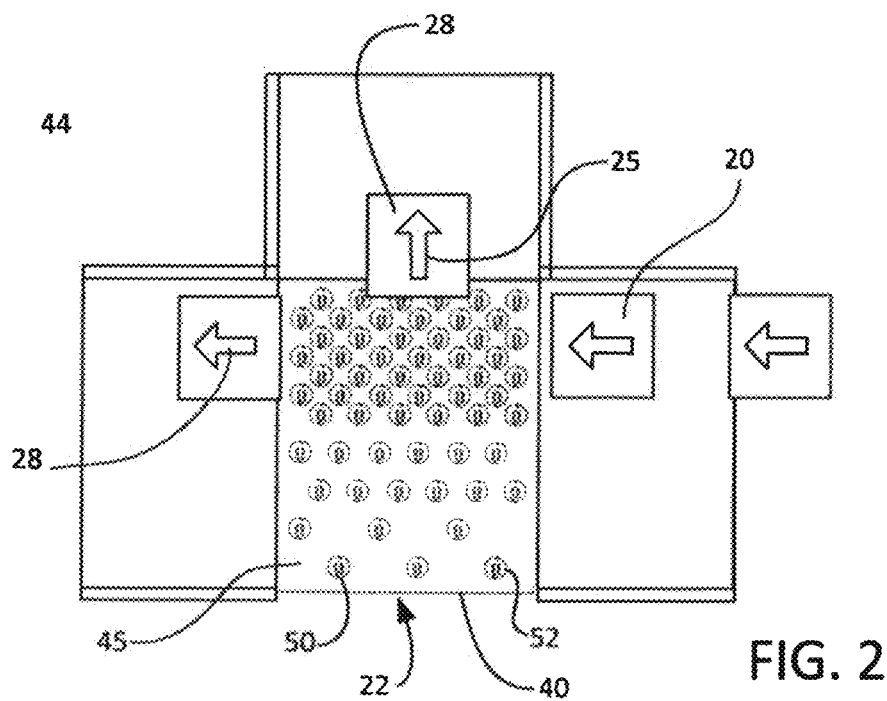
FIG. 2 shows a top view of the divert conveyor of FIG. 1 having the array of pitch independent transmissions diverting articles in a second direction.
Figure 3:
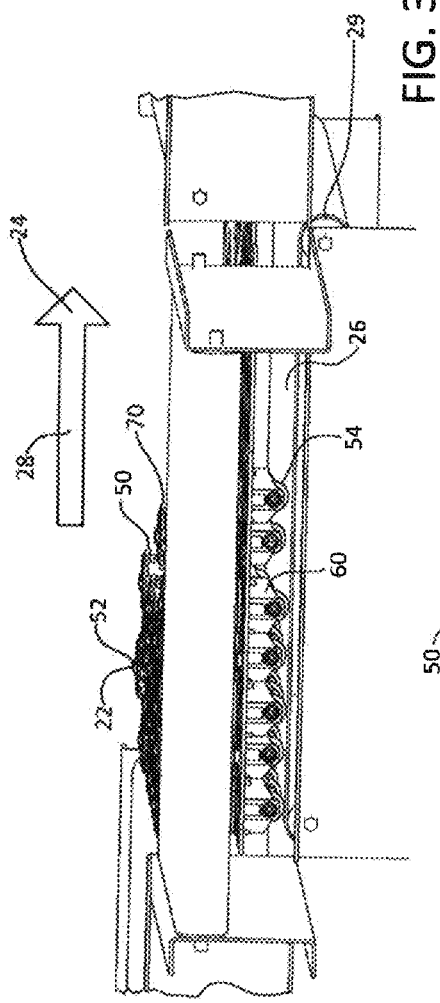
FIG. 3 shows an isometric view of the divert table of FIG. 1 partially assembled with the pitch independent transmissions engaged with a power source.
Figure 4:
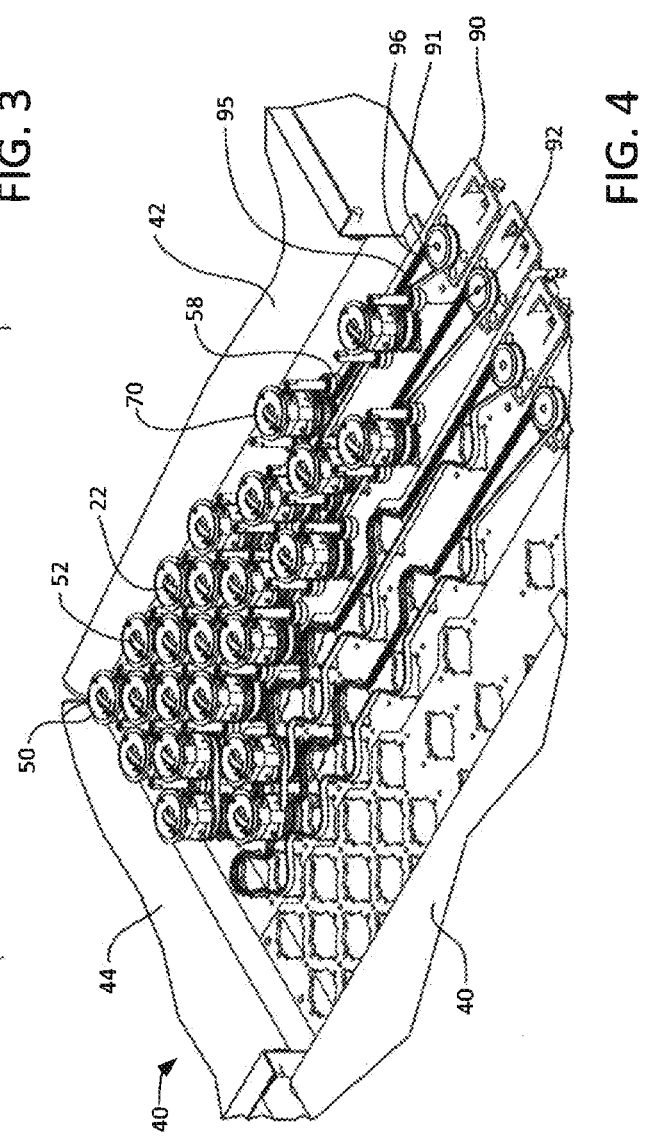
FIG. 4 shows a different isometric view of the partially assembled divert table of FIG. 3 showing the array of pitch independent transmissions attached to a baseplate and operably coupled to multiple actuators by a toothed timing belt.
Figure 5:
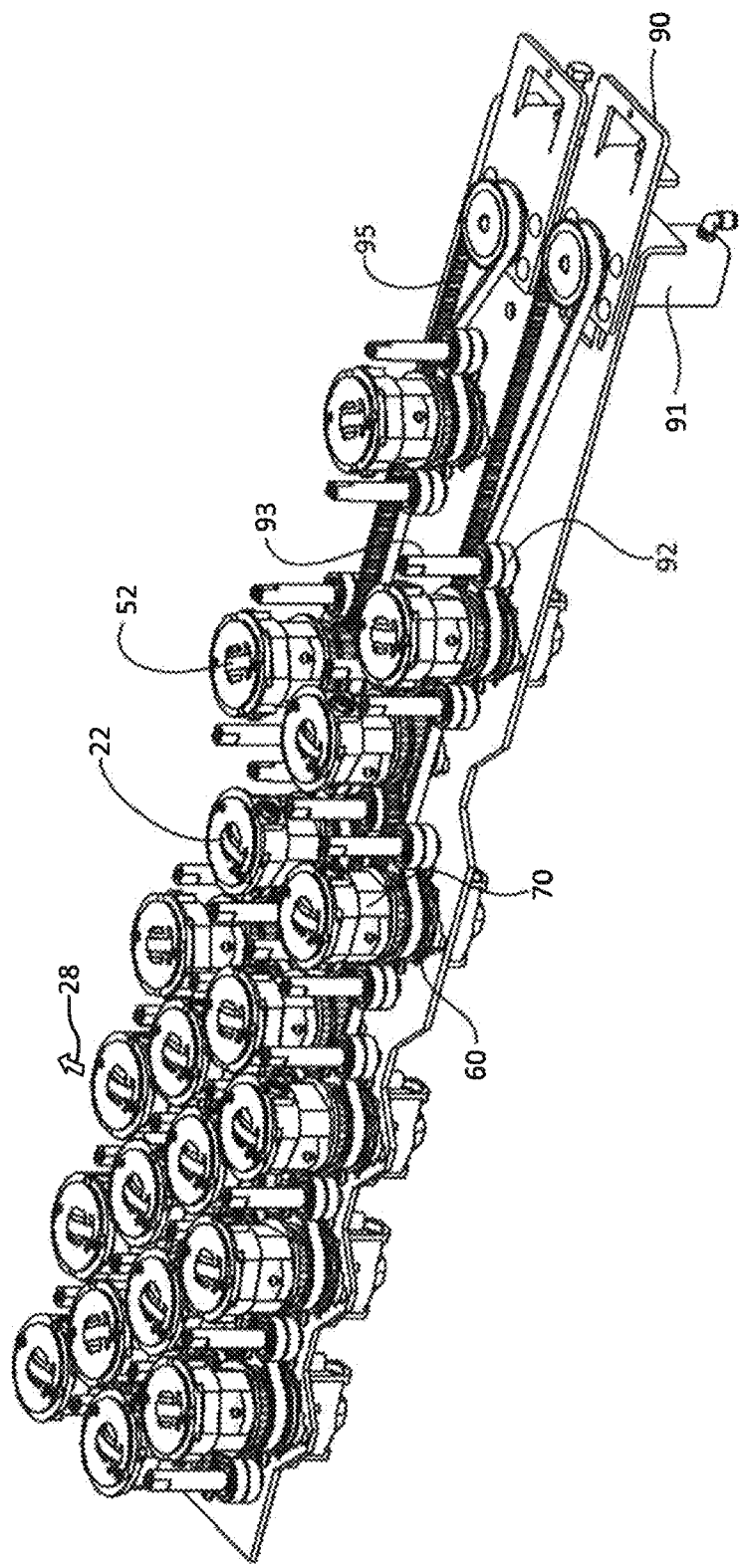
FIG. 5 shows an isometric view of one of the baseplates of FIG. 4 with the pitch independent transmissions operably coupled to a pair of actuators by toothed timing belts showing how a tooth spacing of the toothed timing belts can affect a driving direction of output rollers.

The innovation disclosed and claimed herein, in one aspect thereof, comprises a pitch independent transmission or pitch independent transmission 50 (see FIGS. XX-=XX) that can be used to divert articles 20 conveyed on a divert or divert conveyor 40. As shown in FIGS. 1 and 2, a plurality of pitch independent transmissions 50 can be mounted or attached to the divert conveyor 40 as a row or array for selectively diverting articles 20 from a first direction 24 to a second direction 25 different from the first direction 24 by simultaneously rotatably positioning the pitch independent transmissions 50 from the position shown in FIG. 1 to the positions shown in FIG. 2. In FIG. 1, a primary conveyor 42 is shown conveying articles 20 in single file in the first direction 24 along the primary conveyor 42 and across the divert conveyor 40. In FIG. 2, the divert conveyor 40 is shown diverting conveyed articles 20 from the first direction 24 to the second direction 25. Each pitch independent transmission 50 can have an output drive or output roller 52 that may protrude or extend from a top of transmission 50. Output rollers 52 may define the conveying surface 22 and can be powered to drive or convey articles 20 in a driven direction 28 such as first direction 24 and second direction 25. The pitch independent transmissions 50 can be interconnected together by a toothed timing belt 95 to an actuator 91 as shown in FIGS. 3-5. The toothed timing belt 95 can have teeth 96 evenly spaced there along with a fixed distance, pitch, or teeth spacing 97 between teeth 96 (see FIGS. 17-18). The engagement of the teeth 96 of the toothed timing belt 95 with each pitch independent transmission 50 rotatably limits the driven direction 28 of each output roller 52 to a multiple of the teeth spacing 97 between teeth 96. As shown in FIG. 5, some output rollers 52 can be oriented by the multiple of the teeth spacing 97 between teeth 96 to have a driven direction 28 different than adjacent rollers 52. The present innovation can include an adjuster 71 on each of the pitch independent transmissions 50 to provide adjustment of the driven direction 28 for each output roller 52 so that all output rollers 52 in the array can be adjusted to a same driven direction 28 such as the first direction 24 or the second direction 25.

FIG. 3 illustrates an example of a power source 26 such as a moving belt conveyor 27 passing beneath the array of pitch independent transmissions 50 in power transmitting contact therewith. The contact can transmit power to the output roller 52 to convey articles 20 in a driven direction 28 (see FIGS. 1 and 2 and FIGS. 17 and 18) such as, but not limited to, the first direction 24 and the second direction 25. As shown in FIG. 3, the power source for the moving belt conveyor 27 can be a motor driven roller 29. The diverting conveyor 40 of FIGS. 3 and 4 is shown partially assembled for clarity, and has top plate 45 removed. Top plate 45 can include a plurality of openings 46 matching the array of pitch independent transmissions 50 with the he output rollers 52 extending above. The pitch independent transmission 50 of the present innovation can be an alternate embodiment of a transmission or drive described in previously filed U.S. non-provisional patent application Ser. No. 14/063,400, entitled Transmission Having Variable Output Orientation, which was filed on Oct. 25, 2013 by John Joseph Wilkins, which is hereby incorporated by reference in its entirety.

FIG. 4 shows the divert conveyor 40 partially assembled for clarity with top plate 45 removed. A baseplate 90 attaches to the divert conveyor 40 and an array of first housings 60 attach to the baseplate 90. Second housings 70 rotatably attach to first housings 60 with each independently rotatable about a respective axis A perpendicular to the conveying surface 22 (see FIG. 6). An actuator 91 and the array of pitch independent transmissions 50 can attach to baseplate 90. Actuator 91 is depicted as a rotary actuator but is not limited thereto. Baseplate 90 can be modular as shown in FIG. 4 with each module comprising a baseplate 90 with actuator 91, the array of pitch independent transmissions 50 and the toothed timing belt 95 interconnecting the array of pitch independent transmissions 50 to the actuator 91. In response to movement of the actuator 91 and toothed timing belt 95, all of the pitch independent transmissions 50 can simultaneously rotate to selectively divert articles from a first direction 24 to a second direction 25 different from the first direction 24. Toothed timing belt 95 can have teeth 96 spaced apart along a length thereof at a fixed teeth spacing between teeth 96 which operably engage with second housings 70 of each transmission 50.

Figure 17:
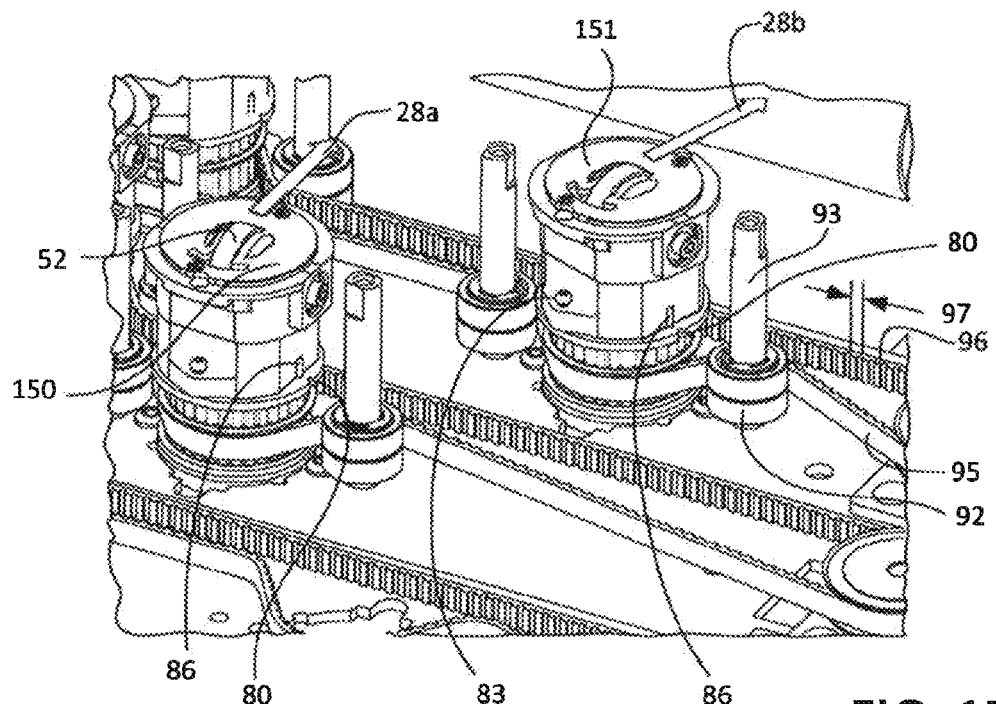
FIG. 17 shows an isometric view of a portion of the baseplates of FIG. 5 with the pitch independent transmissions operably coupled to a pair of actuators by toothed timing belts showing how a tooth spacing of the toothed timing belts can cause different driving direction for two output rollers engaged therewith.
Figure 18:
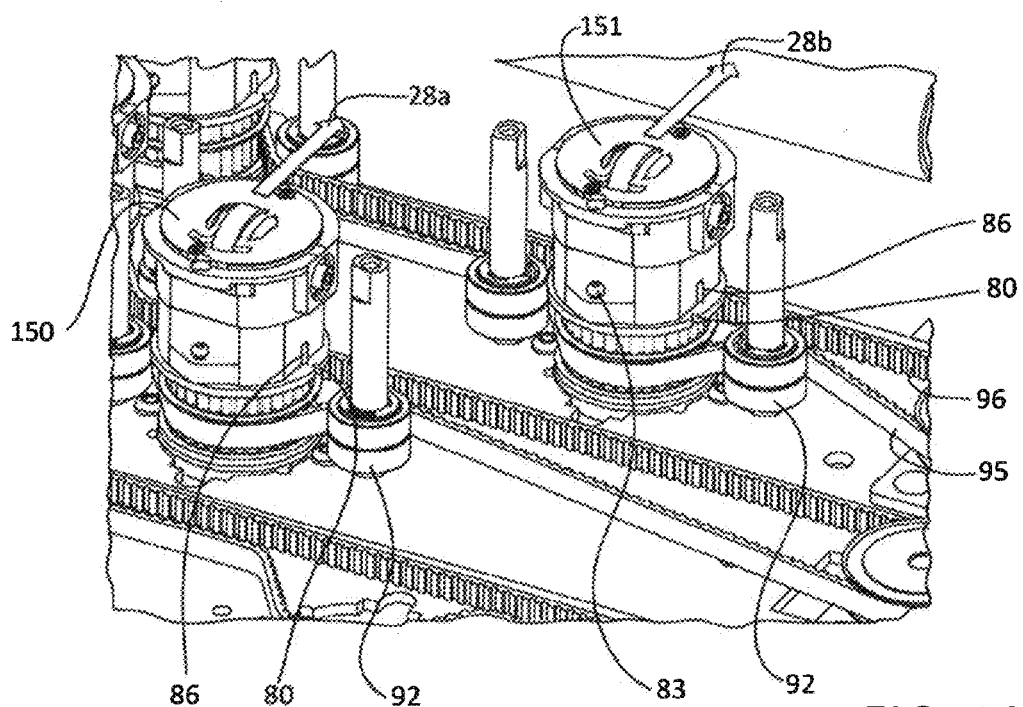
FIG. 18 shows an isometric view of a portion of the baseplates of FIG. 17 with the driving directions synchronized by adjustment of the upper housing to the toothed timing belt pulley with the adjuster.

The serpentine path of toothed timing belt 95 can wrap in operative engagement around each timing belt pulley 72 of a respective second housing 70 with the teeth 96 in timed engagement therewith. To ensure that the timing belt pulley 72 of each second housing 70 remains in toothed engagement with the toothed timing belt 95 without slippage, a sufficient wrap angle can be used so that a sufficient number of teeth 96 are always in engagement with a respective timing belt pulley 72 to prevent the teeth 96 from jumping out of engagement therewith. For toothed timing belts with close together teeth 96, the wrap angle can be less as more teeth will be in engagement. To accomplish a sufficient wrap angle, idler rollers or idlers 92 can be placed between adjacent pitch independent transmissions 50 as shown in FIGS. 17-18 to rotatably contact a non-toothed side of the toothed timing belt 95. Idler rollers 92 can rotatably mount to spacer members 93 extending upwards from baseplate 90.

FIG. 5 shows an assembly of baseplate 90, pitch independent transmissions 50, the actuator 91 and the toothed timing belt 95 having output rollers 52 driving in different driven directions 28. As described previously, teeth spacing 97 can rotatably limit the driven direction 28 of an output roller 52 to a multiple of the teeth spacing 97 between teeth 96 and this can change the driven direction 28 of an output roller 52 as also shown in FIG. 17. Other factors can affect the output direction 28 of an output roller 52 such as but not limited to: part tolerances, rotational changes during tensioning of the toothed timing belt 95, and stretch of the toothed timing belt 95.

Figure 6:
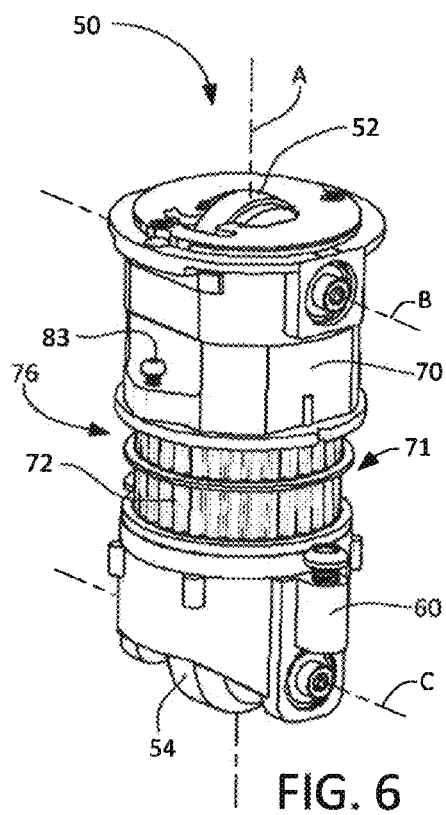
FIG. 6 shows an isometric view of a pitch independent transmission of FIG. 5.
Figure 7:
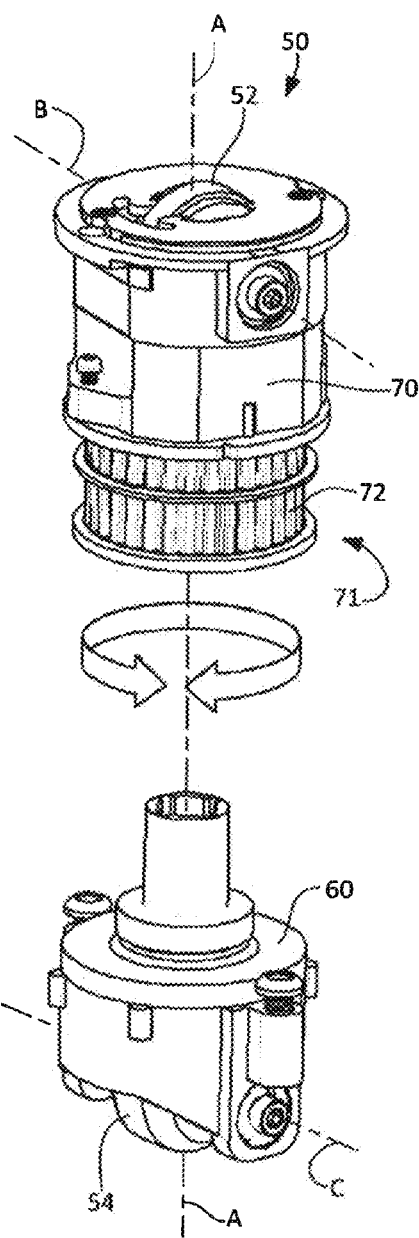
FIG. 7 shows an isometric view of the pitch independent transmission of FIG. 6 with a second housing positioned above a first housing.

As shown in at least FIGS. 6-7, each pitch independent transmission 50 can comprise a first housing 60 for attachment to the diverting conveyor 40 and a second housing 70 rotatable around the first housing 60 to define a first axis of rotation A perpendicular to the conveying surface 22. The output roller 52 can be rotatably attached to the second housing 70 to rotate around a second axis of rotation B parallel to the conveying surface 22. Output rollers 52 extend above from each pitch independent transmission 50 to define the conveying surface 22. Rotating the second housing 70 around first axis A repositions the output roller 52 about axis A and redirects the drive direction 28 thereof. One example of this is illustrated in FIGS. 1 and 2 by the 90-degree directional change of the array of output rollers 52. In FIG. 1, the output rollers 52 are positioned to move articles 20 in the first direction 24, and in FIG. 2, the array of output rollers 52 are rotated an amount that can be 90 degrees to move articles in the second direction 25. At least the first housing 60, second housing 70 and the timing belt pulley 72 can be constructed from any one of a range of thermoplastics such as polycarbonate for example. Alternately, at least the first housing 60, second housing 70 and the timing belt pulley 72 can be constructed from a thermoset plastic.

An input drive or input roller 54 can be rotatably attached to first housing 60 to rotate around axis C and a portion of the input roller 54 can extend from an underside of the first housing 60. Axis C may be parallel to the conveying surface. As shown in FIG. 3, each input roller 54 can be in power transmitting contact with the power source 26 shown as moving belt conveyor 27 passing beneath the array of transmissions 50. Input roller 54 may be operably coupled to output roller 52 for the transmission of rotation and power to move or convey articles 20 in a driven direction 28 such as first direction 24 or second direction 25.

Figure 8:
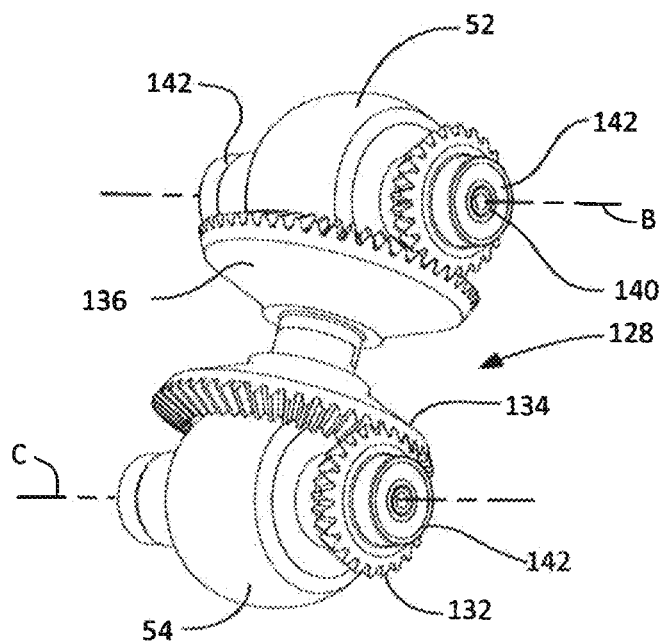
FIG. 8 shows an isometric view of a drive train that can mount within first housing and second housing of the pitch independent transmission shown in FIG. 5 to transmit rotation and power from an input roller to an output roller through gearing.

FIG. 8 shows a drive train 128 that can be used to transmit rotation and power from input roller 54 to output roller 52 through gearing. Drive train 128 can mount within or be carried by first housing 60 and second housing 70 with input roller 54 and output roller 52. Drive train 128 may be configured to engage as an input linear motion oriented in a first direction lying in a first plane and output linear motion in any direction lying in a second plane which is not necessarily parallel to the first plane. In the embodiment depicted, drive train 28 comprises input drive or input roller 54 driving first pinion 132, first bevel 134 driven by first pinion 132, second bevel 136 driven by first bevel 134, second pinion 138 driven by second bevel 136, and output drive or output roller 52 driven by second pinion 138. An input shaft 140 can extend through output roller 52 and rotatingly engage with second housing 70 through bearings 142. An output shaft 144 can extend through input roller 154 and can be mounted in first housing 60 by bearings 142. A detailed description of drive train 128 can be found in previously filed U.S. non-provisional patent application Ser. No. 14/063,400, entitled "Transmission Having Variable Output Orientation", which was filed on Oct. 25, 2013 by John Joseph Wilkins, which this application is a continuation in part, and which is hereby incorporated by reference in its entirety.

Figure 9:
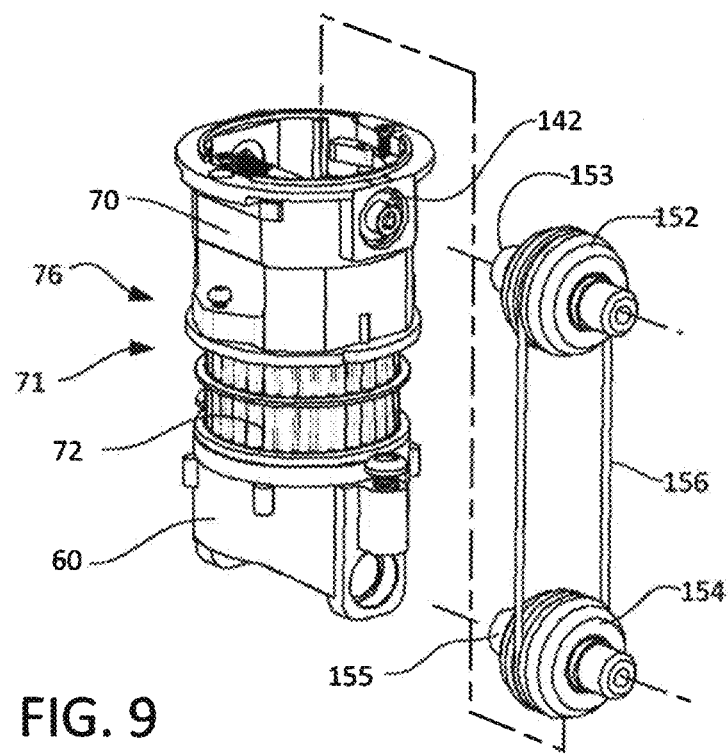
FIG. 9 shows an alternate embodiment of a drive train that comprises a grooved input roller and a grooved output roller operably coupled together with a flexible o-band that mounts within first housing and second housing.

FIG. 9 shows an alternate embodiment of a drive train 158 that comprises a grooved input roller 154 and a grooved output roller 152 that can mount within or be carried by first housing 60 and second housing 70. An o-band or flexible member 156 can operably connect the grooved input roller 154 and a grooved output roller 152 together to transfer rotation and power from grooved input roller 154 to grooved output roller 152. Input roller 152 can have an input shaft 155 extending therethrough to rotatably mount to first housing 60. Bearings 142 can operably rotatably connect between input shaft 153 and first housing 60 to rotate around axis C. An output shaft 153 can extend through output roller 152 and can rotatably operably connect with second housing with bearings 42 to rotate around axis B. O-band or flexible member 156 can be constructed from a stretchable material such as an elastomer or polyurethane for example.

FIGS. 10-16 show the assembly and locking of the adjuster 71. Adjuster 71 can comprise a timing belt pulley 72 rotatable about second housing 70 A and a lock 76 configured to releasably lock and unlock the timing belt pulley 72 to the second housing 70 as required. The adjuster 71 can adjust the driven direction 28 of an output roller 52 to match the driven direction of other output rollers 52. The adjuster 71 of the present innovation can attach to the second housing 70.

Figure 10:
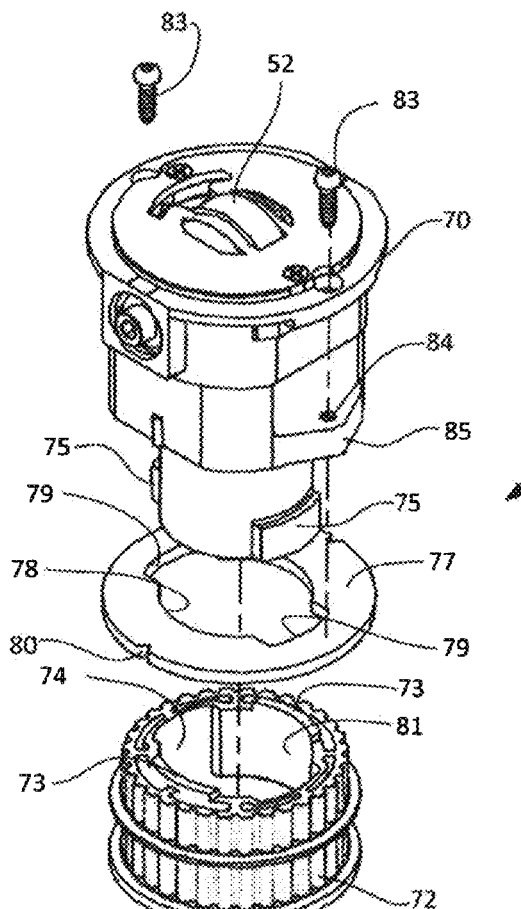
FIG. 10 shows an exploded view of an adjuster attached to the second housing of FIG. 5 comprising a timing belt and an adjustable lock to provide adjustment of a driven direction for each output roller 52 relative to the timing belt pulley.

FIG. 10 shows an isometric partially exploded view of the adjuster 71 which can comprise a timing belt pulley 72 and lock 76, and may attach to second housing 70. Second housing 70 includes screw boss 85 extending laterally from each side of housing 70 about a midpoint thereof. Locking keys 75 may extend laterally outward from each side of the second housing 70 about a base thereof. Timing belt pulley 72 has a pulley bore 81 and opposed pulley key slots 74. A pair of opposed ribs 73 extend upwards from timing belt pulley 72 at sides of pulley bore 81. Lock 76 can further comprise a locking plate 77 having a plate bore 78 with opposed key slots 79. Locking plate 77 can be a metal not limited to steel or stainless steel to provide a hard surface for the screws 83 to contact. A mark or notch 80 can be located at an edge of the locking plate 77 at a position about 90 degrees from the opposed key slot 79 to indicate the rotational position of the second housing 70 relative to the timing belt pulley 72 and will be described later. In FIG. 9, locking plate 77 is oriented for placement onto the second housing 70 by the alignment of the key slots 79 of the locking plate 77 relative to the locking keys 75 of the second housing 70. The timing belt pulley 72 is also positioned for alignment onto the second housing 70 by the orientation of the pulley key slots 74 of the timing belt pulley 72 with the locking keys 75 of the second housing 70. Screws 83 are poised to be threaded into holes 84 in screw bosses 85.

Figure 11:
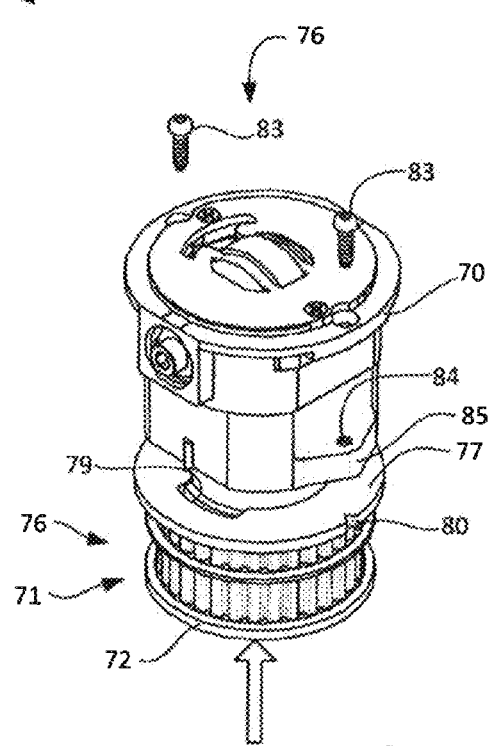
FIG. 11 shows an exploded view with parts of the adjuster of FIG. 10 brought together.

FIG. 11 shows the locking plate 77 and the timing belt pulley 72 moved upwards onto the second housing 70 until the key slots 79 of the locking plate 77 were located just above the locking keys 75 of the second housing 70. In this view, locking plate 77 was rotated about 90 degrees about the housing 70 to engage key slots 79 of the locking plate 77 with the opposed ribs 73 extending upwards from timing belt pulley 72. In FIG. 10, the opposed ribs 73 extending upwards from timing belt pulley 72 are shown keyed or received in the key slots 79 of the locking plate 77 to key or rotationally lock the locking plate 77 to the timing belt pulley 72 about the axis A. Rotation of the timing belt pulley 72 about the housing 70 and axis A rotates the locking plate 77 therewith.

FIG. 12 is an isometric view from an underside of the upper housing 70 showing the timing belt pulley 72 moved upwards onto the second housing 70 until the locking keys 75 of the second housing 70 are positioned just past a bottom of the pulley key slots 74 of the timing belt pulley 72. A step 82 is located in the pulley bore 81 at opposite sides at a bottom of the pulley key slots 74 to lock the timing belt pulley 72.

FIG. 13 is an isometric bottom view of the second housing 70 with the timing belt pulley 72 rotated 90-degrees from FIG. 12. FIG. 14 is a cross section view of FIG. 13. In FIGS. 13 and 14, the rotated timing belt pulley 72 positions the locking keys 75 rotationally midpoint between pulley key slots 74. In this position, the timing belt pulley 72 can rotate around the second housing 70 but may be prevented from moving along axis A in a direction away from the output roller 52 by an interference contact between steps 82 of the timing belt pulley 72 and a top surface of the locking keys 75. Should the timing belt pulley 72 rotate around the second housing 70 to align the pulley key slots 74 of the timing belt pulley 72 with the locking keys 75 of the second housing 70, the timing belt pulley 72 can be removed from the second housing 70. The operation of the adjuster 71 of the present innovation may provide second housing 70 with at least +/−90 degrees of rotational adjustment from the position shown in FIG. 13 relative to the timing belt pulley 72 when the toothed timing belt has teeth 96 in operable engagement with the timing belt pulley 72. That is, the adjuster 71 can have a total operative adjustment range of least one hundred and eighty degrees of adjustability.

Figure 15:
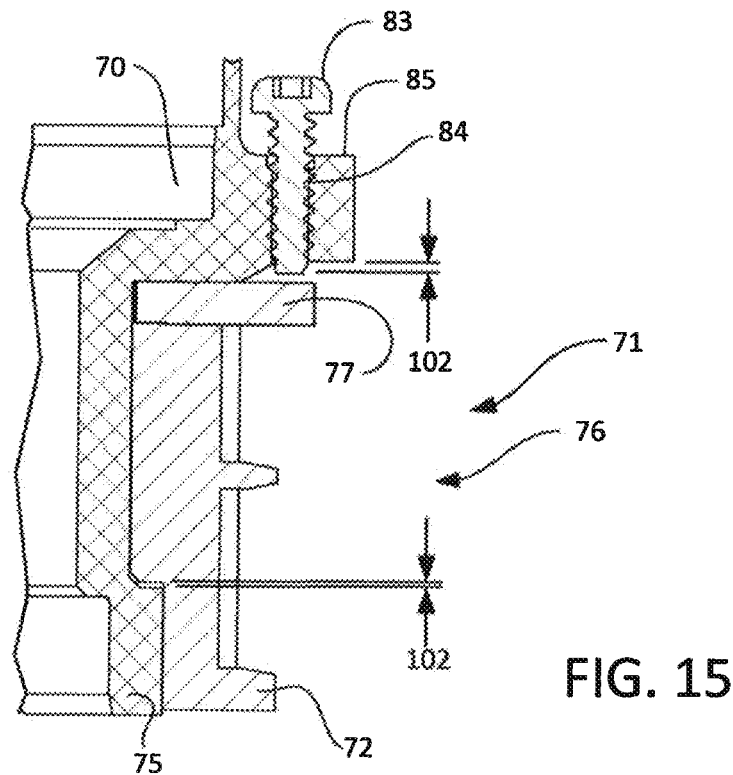
FIG. 15 shows a close up section view of the adjuster of FIG. 14 showing a lock of the adjuster unlocked so that the timing belt pulley can rotate around the upper housing.
Figure 16:
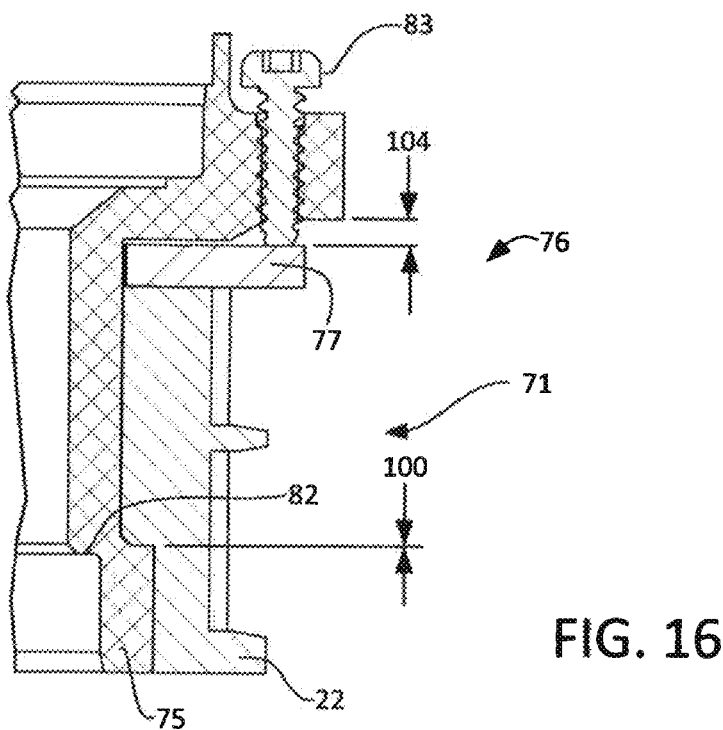
FIG. 16 shows a shows a close up section view of the adjuster of FIG. 11 with the lock of the adjuster locked to lock the timing belt pulley to the upper housing.

FIGS. 15 and 16 are enlarged partial section views of the section view of FIG. 13 showing the interrelations between the screw 83, the timing belt pulley 72, the second housing 70, and the locking plate 77 as the adjuster 71 moves from unlocked in FIG. 14 to locked in FIG. 15. Screws 83 are shown threaded into holes 84 in screw bosses 85 to extend downwards from screw bosses 85 an extension distance 102 with clearance between screws 83 and the locking plate 77.

FIG. 15 shows the timing pulley 72 moved upwards into contact with the locking plate 77 and an upper surface of the locking plate 77 moved upwards into contact with the second housing adjacent to screw 83. This upwards movement shows a small amount of pulley clearance 100 between the steps 82 of the timing belt pulley 72 and top surfaces of both locking keys 75, and the plate clearance 102 between the screws 83 and locking plate 77. When the adjuster 71 is unlocked as shown in FIG. 15, pulley clearance 100 and plate clearance 100 enable second housing 70 to rotate within timing belt pulley 72 around axis A.

FIG. 16 shows the adjuster 71 locked. In FIG. 16, the screws 83 have been rotated to extend farther to an amount 104 to move into contact with the locking plate 77 and to push locking plate 77 and timing belt pulley 72 downward to move the steps 82 of the timing belt pulley 72 into contact with the top surfaces of both locking keys 75 and to eliminate the clearance 100. Screws 83 can be tightened to create a contact or a frictional lock between the steps 82 of the timing belt pulley 72 and the top surfaces of both locking keys 75. The frictional or contact lock between steps 82 and locking keys 75 locks the second housing 70 to the timing belt pulley 72 and locks the adjuster 71. Pitch independent transmissions 50 can be assembled to align a pointer 86 on the upper housing 70 with a notch 80 in the locking plate 77 prior to tightening the screws 83. During assembly of the pitch independent transmissions 150 each pointer 86 is aligned with notch 80 and screws 83 are tightened to lock the adjuster 71. This rotationally locks all output rollers 52 relative to the teeth on the timing pulley 72 so that all pitch independent transmissions 50 have the same driven direction 28 relative to the notch 80 and the teeth on the timing belt pulley 72. As described above, lock 76 can comprise screws 93 threaded into screw bosses 85, the locking plate 77, the steps 82 of the timing belt pulley 72, and the top surfaces of both locking keys 75. Tightening screws 83 brings the steps 82 of the timing belt pulley 72, and the top surfaces of both locking keys 75 together in locking contact to lock the lock 76. Loosening the screws 83 releases the contact of the steps 82 of the timing belt pulley 72 with the top surfaces of both locking keys 75 and unlocks the lock 76. Lock 76 is a contact lock.

FIG. 17 is an enlarged isometric view of a first pitch independent transmission 150 and a second pitch independent transmission 151 in engagement with teeth 96 of the toothed timing belt 95. Adjusters 71 are locked. The output rollers 52 of first pitch independent transmission 150 and second pitch independent transmission 151 are oriented by the multiple of the teeth spacing 97 between teeth 96. As shown, driven direction 28a of first pitch independent transmission 150 is different than driven direction 28b second pitch independent transmission 151.

FIG. 18 is an enlarged isometric view of a first pitch independent transmission 150 and a second pitch independent transmission 151 of FIG. 17. In this view, the screws 83 of second pitch independent transmission 151 have been loosened, the upper housing 80 of the second pitch independent transmission 151 was rotated around axis A within the timing belt pulley 72 until the driven direction 28b of the second pitch independent transmission 150 matches the driven direction 28a of the first pitch independent transmission 150. Then the adjuster 71 of the second pitch independent transmission 151 was locked by tightening screws 83 to place both in alignment. The rotational re-alignment of the second pitch independent transmission 151 is indicated by the different rotational orientation of the pointer 86 relative to the notch 80 in FIG. 18 when compared to FIG. 17.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

For example, In the above description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A diverting conveyor having a conveying surface for selectively diverting articles from a first direction to a second direction different from the first direction, the diverting conveyor comprising:
    an actuator attached to the diverting conveyor;
    an array of transmissions each having a first housing attached to the diverting conveyor and a second housing rotatable around the first housing about an axis perpendicular to the conveying surface, each second housing having a timing belt pulley and an output roller attached to the second housing to rotate around the first axis therewith, each output roller rotatably attached to the second housing to rotate about a second axis parallel to the conveying surface and power driven to convey articles in a driven direction;
    a toothed timing belt attached to the actuator and having teeth in operable engagement with each timing belt pulley to interconnect each second housing to the timing belt and to the actuator for simultaneous rotation in response to actuation of the actuator; and
    an adjustor adjustably securing the timing belt pulley to the second housing, wherein when the array of transmissions are rotated with the actuator to position the output rollers to drive articles in the first direction and one of the output rollers has a driven direction different from the first direction, the adjustor of the one of the output rollers having a driven direction different from the first direction is adjustable to redirect the output roller to the first direction.

2. The diverting conveyor of claim 1 wherein the adjustor comprises a releasable lock to releasably lock the second housing to the timing belt pulley, wherein when the releasable lock is unlocked, the second housing can be rotated relative to the timing belt pulley to change the driven direction of the output roller relative to the timing belt pulley.

3. The diverting conveyor of claim 1 wherein the adjustor comprises a releasable lock to releasably lock the second housing to the timing belt pulley, wherein when the releasable lock is locked and teeth of the toothed timing belt are brought into contact with the timing pulley, the second housing rotates to be operatively rotated relative to the timing belt pulley to change the driven direction of the output roller relative to the timing belt pulley.

4. The diverting conveyor of claim 2 wherein when the releasable lock is unlocked and the timing belt pulley is operatively engaged with the teeth of the toothed timing belt, the rotation of the second housing adjusts the driven direction of the output roller relative to the teeth of the timing belt operatively engaged with the timing belt pulley.

5. The diverting conveyor of claim 2 wherein the releasable lock is configured for re-locking to lock the second housing to the timing belt pulley and to lock the driven direction of the output roller relative to the timing belt pulley.

6. The diverting conveyor of claim 2 wherein the releasable lock is a contact lock.

7. The diverting conveyor of claim 2 wherein the releasable lock comprises at least one screw that releasably locks the second housing to the timing belt pulley by bringing a portion of the timing belt pulley into locking contact with a portion of the housing.

8. The diverting conveyor of claim 7 wherein the portion of the timing be pulley brought into locking contact is a step.

9. The diverting conveyor of claim 7 wherein the portion of the housing brought into locking contact is at least one locking key.

10. The diverting conveyor of claim 7 wherein the releasable lock further comprises a locking plate attached to the second housing between the at least one screw and the timing belt pulley to provide a hard contact surface when the least one screw is tightened to lock the releasable lock.

11. The diverting conveyor of claim 10 wherein the second housing includes a pointer and the locking plate includes a mark so that the timing belt pulley can be rotatably aligned to the second housing to rotationally align the teeth of the timing belt pulley to the driven direction of the output roller.

12. The diverting conveyor of claim 10 wherein the timing belt teeth rotationally directionally position the respective output roller to direct articles in a driven direction as an increment of the teeth spacing of the toothed timing belt.

13. The diverting conveyor of claim 10 further comprising idler rollers attached to a baseplate and positioned between adjacent transmissions to ensure the toothed timing belt has sufficient wrap angle to ensure engagement of the timing belt teeth with the timing belt pulley.

14. A diverting conveyor having a conveying surface comprising an array of transmissions each interconnected together by a toothed timing belt to an actuator for selectively diverting articles from a first direction to a second direction different from the first direction in response to movement of the actuator, each transmission comprising:
   an array of first housings attached to the diverting conveyor;
   a second housing rotatable around each first housing to define a first axis of rotation perpendicular to the conveying surface;
   an output roller rotatably attached to each second housing to define the conveying surface, each output roller connected to a source of power and rotatable around a second axis of rotation parallel to the conveying surface to directionally convey articles thereon with the plurality of rollers defining the conveying surface; and
   an adjuster attached to the second housing comprising a timing belt pulley and a lock, the timing belt pulley rotatable about the first axis of rotation and the lock configured to releaseably lock the timing belt pulley to the second housing at a position to direct articles in a driven direction with the output roller,
   wherein when the teeth of the toothed timing belt are brought into operable engagement with the array of locked timing belt pulleys, each second housing is configured to rotate independently around the respective first axis to align the timing belt pulley with the teeth of the timing belt and to rotationally directionally position the respective output roller to direct articles in a driven direction as an increment of the teeth spacing of the toothed timing belt,
   wherein when the toothed timing belt is brought into operable engagement with the array of locked timing belt pulleys, the actuator positions the array of output rollers to divert articles in the first direction, and at least one of the engaged output rollers in the operably engaged array has a driven direction different than the first direction from operable engagement with the teeth of the toothed timing belt, the adjuster of at least one of the engaged output rollers with a different driven direction is configured to be adjusted to reposition the output roller around the first axis to drive articles in the first direction.

15. The transmission of claim 14 wherein the lock is a contact lock.

16. The transmission of claim 14 wherein the adjuster has an operative adjustment range of at least 90 degrees.

17. The transmission of claim 14 wherein the adjuster has a total operative adjustment range of least one hundred and eighty degrees of adjustability.

* * * * *